US011861219B2

(12) United States Patent
Li et al.

(10) Patent No.: US 11,861,219 B2
(45) Date of Patent: Jan. 2, 2024

(54) BUFFER TO REDUCE WRITE AMPLIFICATION OF MISALIGNED WRITE OPERATIONS

(71) Applicant: Intel Corporation, Santa Clara, CA (US)

(72) Inventors: Peng Li, Beaverton, OR (US); Jawad B. Khan, Portland, OR (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 872 days.

(21) Appl. No.: 16/712,703

(22) Filed: Dec. 12, 2019

(65) Prior Publication Data

US 2020/0117397 A1 Apr. 16, 2020

(51) Int. Cl.
*G06F 3/06* (2006.01)

(52) U.S. Cl.
CPC .......... *G06F 3/0659* (2013.01); *G06F 3/0614* (2013.01); *G06F 3/0646* (2013.01); *G06F 3/0653* (2013.01); *G06F 3/0656* (2013.01); *G06F 3/0679* (2013.01)

(58) Field of Classification Search
CPC .... G06F 3/0614; G06F 3/0646; G06F 3/0653; G06F 3/0656; G06F 3/0659; G06F 3/0679
See application file for complete search history.

(56) References Cited

U.S. PATENT DOCUMENTS

| | | | | |
|---|---|---|---|---|
| 5,583,876 | A * | 12/1996 | Kakuta | G06F 11/1076 714/766 |
| 8,724,392 | B1 * | 5/2014 | Asnaashari | G06F 3/0689 365/158 |
| 10,078,453 | B1 | 9/2018 | Li et al. | |
| 10,365,832 | B2 | 7/2019 | Dahlen et al. | |
| 10,469,252 | B2 | 11/2019 | Schmisseur et al. | |
| 10,649,813 | B2 | 5/2020 | Schmisseur et al. | |
| 2007/0091679 | A1 * | 4/2007 | Nishihara | G11C 16/0483 365/185.11 |

(Continued)

OTHER PUBLICATIONS

Gao, Congming, et al. "Parallel all the time: Plane level parallelism exploration for high performance SSDs." 2019 35th Symposium on Mass Storage Systems and Technologies (MSST). IEEE, 2019. (Year: 2019).*

*Primary Examiner* — Charles Rones
*Assistant Examiner* — Hewy H Li
(74) *Attorney, Agent, or Firm* — Compass IP Law PC (57) ABSTRACT

Examples herein relate to a storage system that separately handles portions of a write operation that are aligned and misaligned with respect to retrievable segments from a storage device. For misaligned portions, a buffer can be used to store misaligned retrievable segments and update the segments with content provided with the write operation. Aligned portions of content associated with a write request can be written directly to the storage medium or overwrite corresponding retrievable segments present in the buffer. A table or array can track logical block addresses that correspond to content in the buffer or in the storage. Content in the buffer can be kept in the buffer without being backed-up or persisted to the storage until a triggering event occurs such as power loss or low space in the buffer.

18 Claims, 7 Drawing Sheets

(56) References Cited

U.S. PATENT DOCUMENTS

| | | | |
|---|---|---|---|
| 2009/0113121 A1* | 4/2009 | Lee | G06F 12/0246 |
| | | | 711/E12.001 |
| 2010/0318632 A1* | 12/2010 | Yoo | H04L 67/5682 |
| | | | 709/219 |
| 2014/0317335 A1* | 10/2014 | Fukutomi | G06F 3/0659 |
| | | | 711/103 |
| 2017/0177482 A1 | 6/2017 | Greenspan | |
| 2018/0189000 A1 | 7/2018 | Li et al. | |
| 2019/0065112 A1 | 2/2019 | Schmisseur et al. | |
| 2019/0181865 A1 | 6/2019 | Leong | |
| 2019/0235779 A1 | 8/2019 | Li | |

* cited by examiner

FIG. 1

| IU index | Physical address |
|---|---|
| 0 | 0xFF 000001 |
| 1 | 0x00 11EABD |
| 2 | 0xEF 111111 |
| 3 | 0xFF 11ADE1 |

BUFFER TO REDUCE WRITE AMPLIFICATION OF MISALIGNED WRITE OPERATIONS

BACKGROUND

A solid state drive (SSD) can include one or more packages of non-volatile memory dies. In some implementations, a die is composed of memory cells, memory cells are organized into pages and pages are organized into blocks. A memory cell can store one or more bits of information. For storage access requests, a NAND-based SSD can use an indirection table that provides a logical block address to physical block address (L2P) conversion of logical addresses, such as logical block addresses (LBAs), to NAND physical block addresses (PBAs).

DETAILED DESCRIPTION

In a computer system with accessible storage or memory, various operating systems (OS) issue write requests at LBA sector sizes of 5xxB (such as 512B, 520B, and 528B) or 4xxxB (such as 4096B and 4160B) (where B represents a byte). LBA sector sizes are not expected to grow in the foreseeable future, but may change depending on specifications of the file systems (FS). In some examples, an SSD uses a 4 KibiByte (KiB) Indirection Unit (IU) size to map the LBAs to physical addresses of the media (e.g., NAND flash). An L2P table that stores the NAND physical block addresses with a 4 KiB (4096 byes) indirection unit (IU) granularity and 4-bytes per entry consumes 1 MebiByte (MiB) of volatile memory space per GibiByte (GiB) of SSD logical memory capacity. The L2P table therefore uses 1 GiB of volatile memory for a 1 TebiByte (TiB) SSD item identifier (where the SSD has 1 TiB logic capacity, while its physical capacity may be larger), and 16 GiB of volatile memory for a 16 TiB SSD (an SSD with 16 TiB of NAND for storing user data).

The IU size is expected to grow to 16 KiB and even to 64 KiB as the SSD capacity grows. As IU size grows, so does the requirement for available volatile memory (or other media used to store the L2P table) but available memory space for the table may be limited.

Unaligned host writes occur when an LBA range of a write request is misaligned with the IU starting and ending address boundary. In other words, an unaligned or misaligned write request occurs when a starting and ending LBA range of a write request does not correspond with respective starting and ending LBA of an IU. By contrast, an aligned write request occurs when a starting and ending LBA range of a write request corresponds with respective starting and ending LBA range of an IU.

Write amplification refers to an amount of data written to storage media divided by an amount of data associated with a write request. Misaligned writes can introduce an SSD write amplification (WA) above one (1). As the IU size continues to increase, write amplification from misaligned write requests will further increase. For example, one 512B host write to an SSD with 4 KiB IU will be amplified 8 times in addition to a performance penalty (e.g., NAND page read time) associated with a data read, data modify, data write (Read-Modify-Write) operation.

For example, if an IU size is 4 KiB and a host writes just to LBA0 (single sector), the write is misaligned. A read of IU0 (LBA0 to LBA7) takes place, data of LBA0 is updated with data from host, then the LBA0 to LBA7 are written back to media with an updated LBA0. This example has an amplification of 8 as a write of one LBA corresponds to 8 LBAs being written to storage.

As another example, if an IU size is 4 KiB and a host writes just to LBA1-LBA8, the write is misaligned. A read of IU0 (LBA0 to LBA7) takes place, data of LBA1-LBA7 are updated with data from host, then the LBA0 to LBA7 are written back to media with updated LBA1-LBA7. A second read of IU1 (LBA8 to LBA15) takes place, data of LBA8 is updated, then write LBA8 to LBA15 are written to the storage with updated LBA8. Note that in some cases, IU0 and IU1 can be read, LBA1-LBA8 updated, and updated IU0 and IU1 written to the media. This example has an amplification of 2 as a write of 8 LBAs corresponds to 16 LBAs being written to storage.

Another example provides for a data write of LBA0-LBA7, which is aligned with an IU0. Data of LBA0-LBA7 are written to the media directly without Read-Modify-Write. This example has an amplification of 1 as a write of 8 LBAs corresponds to 8 LBAs being written to storage.

Various embodiments provide for transfer of unaligned portion of a host write to a buffer to attempt to reduce SSD write amplification (WA) and improve performance. For example, various embodiments use a table or array to identify if a retrievable segment (e.g., IU) stored in a storage is copied in a buffer. A buffer can be used to store retrievable segments and misaligned content of data writes overwrite stored retrievable segments in the buffer. A user need not map LBAs to the buffer manually, but can do so. Instead, a controller can detect the unaligned portion of host writes and map them to the buffer automatically. Content in the buffer can be kept in the buffer without being backed-up or persisted to the storage until occurrence of a triggering event such as power loss or low space in the buffer. Without loss of generality, an Integrated Memory Buffer (IMB) can be used as an example of a buffer. However, various embodiments can provide other forms of a buffer, e.g., persistent memory regions (PMR), non-volatile dual in-line memory module (NVDIMM), persistent memory (e.g., (Intel® Optane®), and so forth. Furthermore, some implementations may implement the buffer inside the SSD and/or in a caching-controller (in hardware and/or in host software).

Various embodiments can provide SSD level write amplification reduction by up to 2-10 times for workloads that feature many misaligned writes. Host level changes to logical block size need not be made (but can be) and compatibility with existing or future host systems can be achieved, without modification, while attempting to reduce write amplification. Performance benefits can be achieved without any host level changes, including device driver, file system, and host applications.

Figure 1:
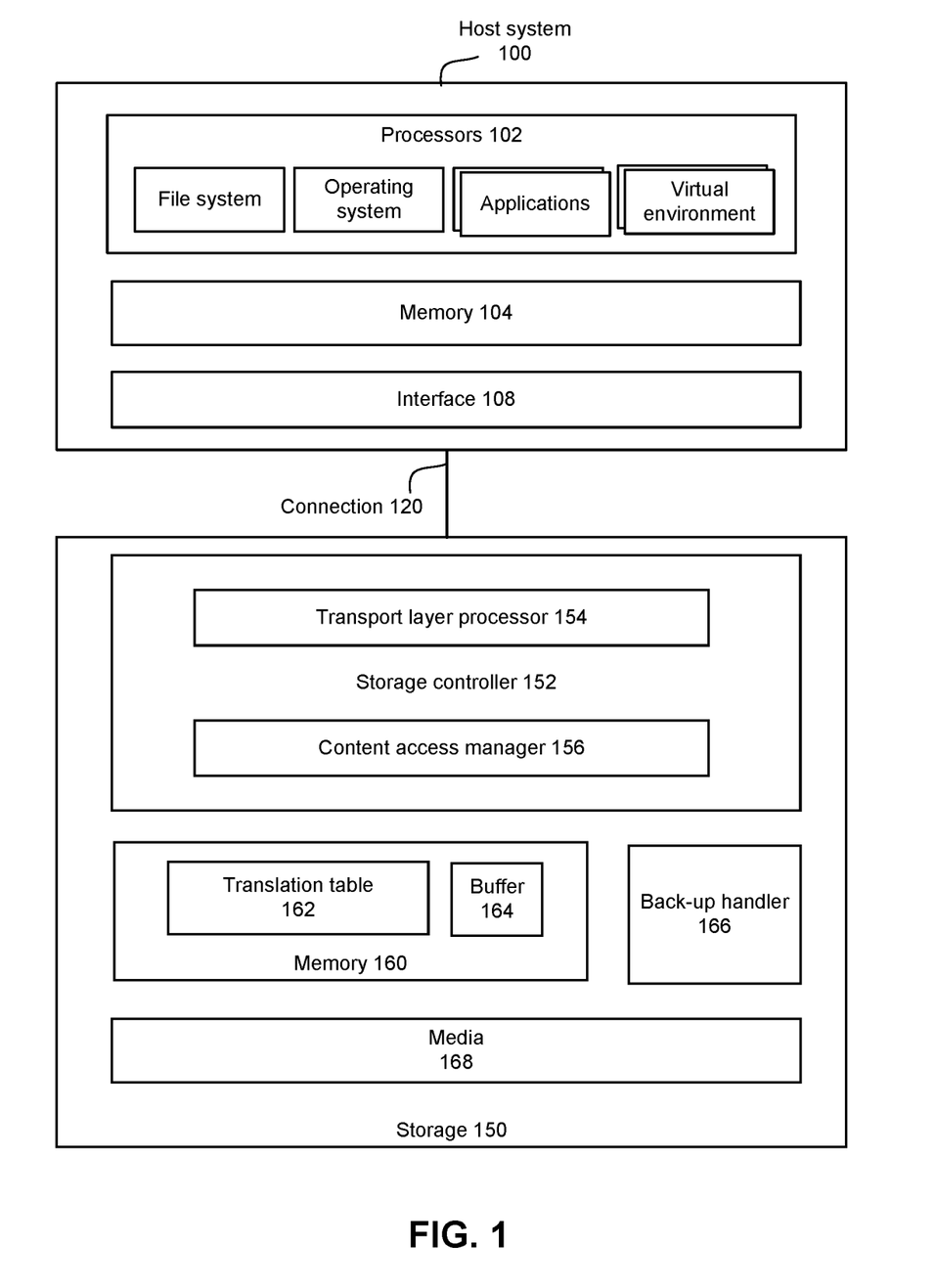
FIG. 1 depicts an example of a system.

FIG. 1 depicts an example of a system. In some examples, host system 100 can include or access processors 102 and memory 104 to execute applications, an operating system, file system, or virtualized execution environments. An operating system can be for example: Microsoft® Windows® operating system, a proprietary UNIX-like operating system, or an open source UNIX-like operating system using a variant of the Linux kernel, MacOS®, or Android®. A virtualized execution environment can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can be an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from each other, allowing virtual machines to run Linux and Windows Server operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers are not installed like traditional software programs, which allows them to be isolated from the other software and the operating system itself. The isolated nature of containers provides several benefits. First, the software in a container will run the same in different environments. For example, a container that includes PHP and MySQL can run identically on both a Linux computer and a Windows machine. Second, containers provide added security since the software will not affect the host operating system. While an installed application may alter system settings and modify resources, such as the Windows registry, a container can only modify settings within the container.

In some examples, processors 102 can include any central processing unit (CPU), graphics processing unit (GPU), field programmable gate array (FPGA), or application specific integrated circuit (ASIC). Memory 104 can be any type of cache or volatile or non-volatile memory. Interface 108 can manage communications using connection 120 with storage 150 and other nodes (not depicted).

Connection 120 can be provide communications compatible or compliant with one or more of: Ethernet (IEEE 802.3), remote direct memory access (RDMA), InfiniB and, Internet Wide Area RDMA Protocol (iWARP), quick UDP Internet Connections (QUIC), RDMA over Converged Ethernet (RoCE), Peripheral Component Interconnect (PCIe), Intel QuickPath Interconnect (QPI), Intel Ultra Path Interconnect (UPI), Intel On-Chip System Fabric (IOSF), Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Storage system 150 can use a storage controller 152 to control accesses (e.g., read or write) of media 168. For example, transport layer processor 154 can encode or decode communications with host system 100 such as read or write requests received or transmitted via connection 120. Content access manager 156 can determine whether a write request is to access aligned and/or misaligned retrievable regions in media 168. For example, a write request that corresponds to a request to write content to media 168 can trigger access of a table 162 to determine if a starting address of the content to be written to media 168 indicates that a retrievable region encompassing the starting address is stored in buffer 164 allocated in memory 160 or media 168. For example, table 162 can be stored in memory 160 or in a static random access memory (SRAM) available to storage controller 152.

Content subject to a write request can include aligned and/or misaligned portions. For portions of the content that are aligned with retrievable region from media 168 (or in buffer 164), determination is made if the retrievable region is stored in buffer 164 and if so, such portions overwrite the buffered content. But if the retrievable region is not stored in buffer 164, such portions are written directly to media 168. In some examples, a retrievable region is an IU of size 4 KiB, but any size can be used.

For portions of the content that are misaligned with retrievable content from media 168 (or in buffer 164), retrievable regions of media 168 that encompass the misaligned content are copied to buffer 164, the retrievable regions are modified to include the misaligned content, and table 162 is updated to indicate that buffer 164 includes the retrievable regions. For example, an entry in table 162 can include a token value set to indicate that a retrievable region having a particular index is stored in buffer 164 and that the entry includes an offset to a location in memory 160 of a starting address of the retrievable region. However, if the token value is not present in the entry, the entry refers to an address reference in media 168. Memory 160 can be any or a combination of: cache, volatile memory, or non-volatile memory.

For example, if storage 150 is configured for 4 KiB IU size and receives a host write for LBA5-15, LBA5-7 are misaligned with IU0 (which encompasses LBA0-7) but LBA8-15 are aligned with IU1 (which encompasses LBA8-15). In this example, both IU0 and IU1 were saved in media 168 but not in buffer 164. For LBA5-7, controller 152 reads LBA0-7 from media 168 to buffer 164 by using an address of IU0 from translation table 162, then overwrites LBA5-7 in buffer 164 by using data from host system 100. Controller 152 updates an address of IU0 in the translation table 162 to identify an offset into buffer 164. For LBA8-15, controller 152 writes the host data to media 168, and the IU1 is stored starting at a different starting address, so controller 152 updates table 162 with the address of IU1 in media 168.

Back-up handler 166 can manage copying of content from buffer 164 to media 168. For example, if a fullness level of buffer 164 meets or exceeds a threshold level, back-up handler 166 can identify content in buffer 164 to evict or copy to media 168 in order to make more space available in buffer 164 and also update table 162 to identify content as stored in media 168. Various techniques can be used to select content to evict such as least recently used (LRU) or least recently accessed. In some cases, if power is lost, back-up handler 166 can flush content of buffer 164 to media 168 and update table 162 to identify content as stored in media 168. For example, a capacitor or other back-up power supply can be used in the event of power loss to ensure power is available to perform a back-up. Asynchronous DRAM Refresh (ADR) can be used to copy content into media 168 upon a power loss to volatile memory. Other conditions can trigger flushing of content from buffer 164 to media 168 such as a timed event.

Media 168 can be any type of volatile or non-volatile memory and include multiple tiers of memory or storage if their write granularity is greater than the host LBA sector size. For example, memory or storage can include one or more of: persistent memory (e.g., Intel Optane® or Samsung Z-NAND), storage (e.g., NAND or 3D NAND), byte-addressable non-volatile memory, or 2-level memory (2LM). As used herein, any reference to storage or memory can refer to any type or configuration or combination of volatile and non-volatile memory.

Various embodiments can use system main memory with at least two levels of memory ("2LM") that includes cached subsets of system disk level storage (in addition to, for example, run-time data). This main memory includes a first level (alternatively referred to herein as "near memory") including smaller faster memory made of, for example, DRAM or other volatile memory; and a second level (alternatively referred to herein as "far memory") which includes larger and slower (with respect to the near memory) volatile memory (e.g., DRAM) or nonvolatile memory storage (e.g., flash memory or byte addressable non-volatile memory (e.g., Intel Optane® or Samsung Z-NAND)). The far memory is presented as "main memory" to the host operating system (OS), while the near memory is a cache for the far memory that is transparent to the OS, thus rendering the embodiments described below to appear the same as prior art main memory solutions. The management of the two-level memory may be done by a combination of logic and modules executed via the host central processing unit (CPU). Near memory may be coupled to the host system CPU via high bandwidth, low latency means for efficient processing. Far memory may be coupled to the CPU via low bandwidth, high latency means (as compared to that of the near memory).

Figure 2:
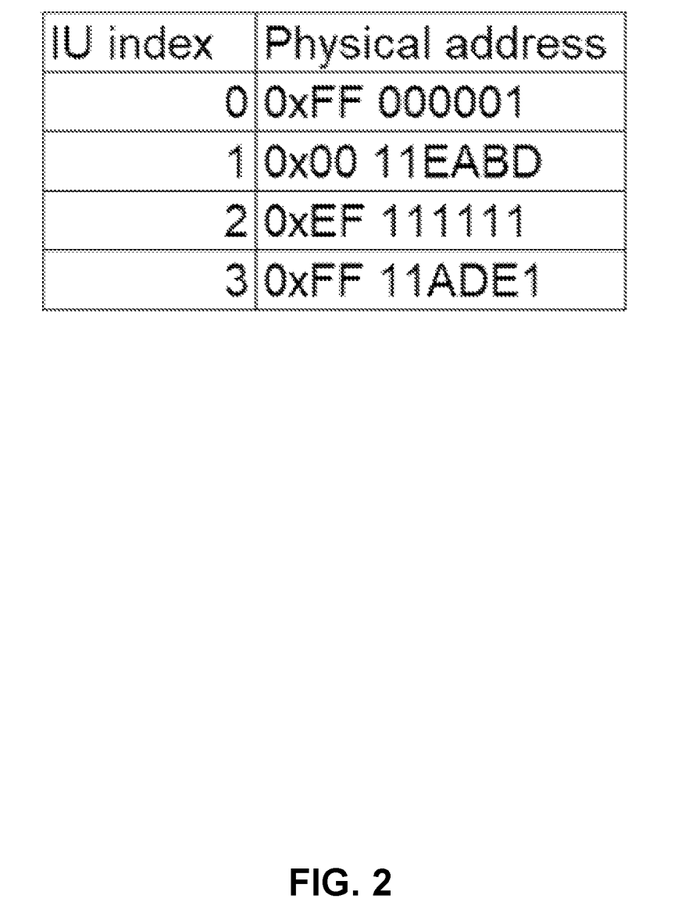
FIG. 2 depicts an example table format.

FIG. 2 depicts an example format of a table. The table can be used to identify whether a retrieval segment (e.g., one or more IUs) are stored in a buffer or not stored in the buffer (e.g., stored in the storage). For example, the table can be stored in volatile memory (e.g., DRAM or SRAM) and accessible to a storage controller. The table can be an array of entries. For example, an entry can be the following format:

[NVM buffer token (e.g., 0xFF), NVM Buffer Offset] or [Physical address in storage].

In one example, an IU index is associated with a physical address. When an IU includes 8 logical blocks starting at logical block 0, the IU index can be determined from a remainder of a modulo 8 operation on a starting at the beginning logical block address (LBA) of a retrieval segment. For example, a beginning LBA of LBA0 corresponds to an index of 0; a beginning LBA of LBA8 corresponds to an index of 1; and a beginning LBA of LBA16 corresponds to an index of 2, and so forth. In this example, a physical address entry is associated with each IU index. But, if content corresponding to an IU index is stored in the buffer, a code can be used in the physical address entry to identify that the IU is stored in the buffer.

For example, if a first byte of a physical address entry is hexadecimal FF, the corresponding IU is stored in the buffer beginning at an offset after the hexadecimal FF. Other codes of shorter or longer size can be used. Accordingly, retrieval of an IU can include retrieval of content starting at an offset and includes 8 LBAs starting at the offset. An LBA can be a 512 bytes in size, for example, but other sizes can be used depending on the file system used.

However, if a first byte of a physical address entry is not hexadecimal FF (or other code used to indicate storage in the buffer), the corresponding IU is stored in storage at a physical address identified by the entire physical address entry.

Figure 3:
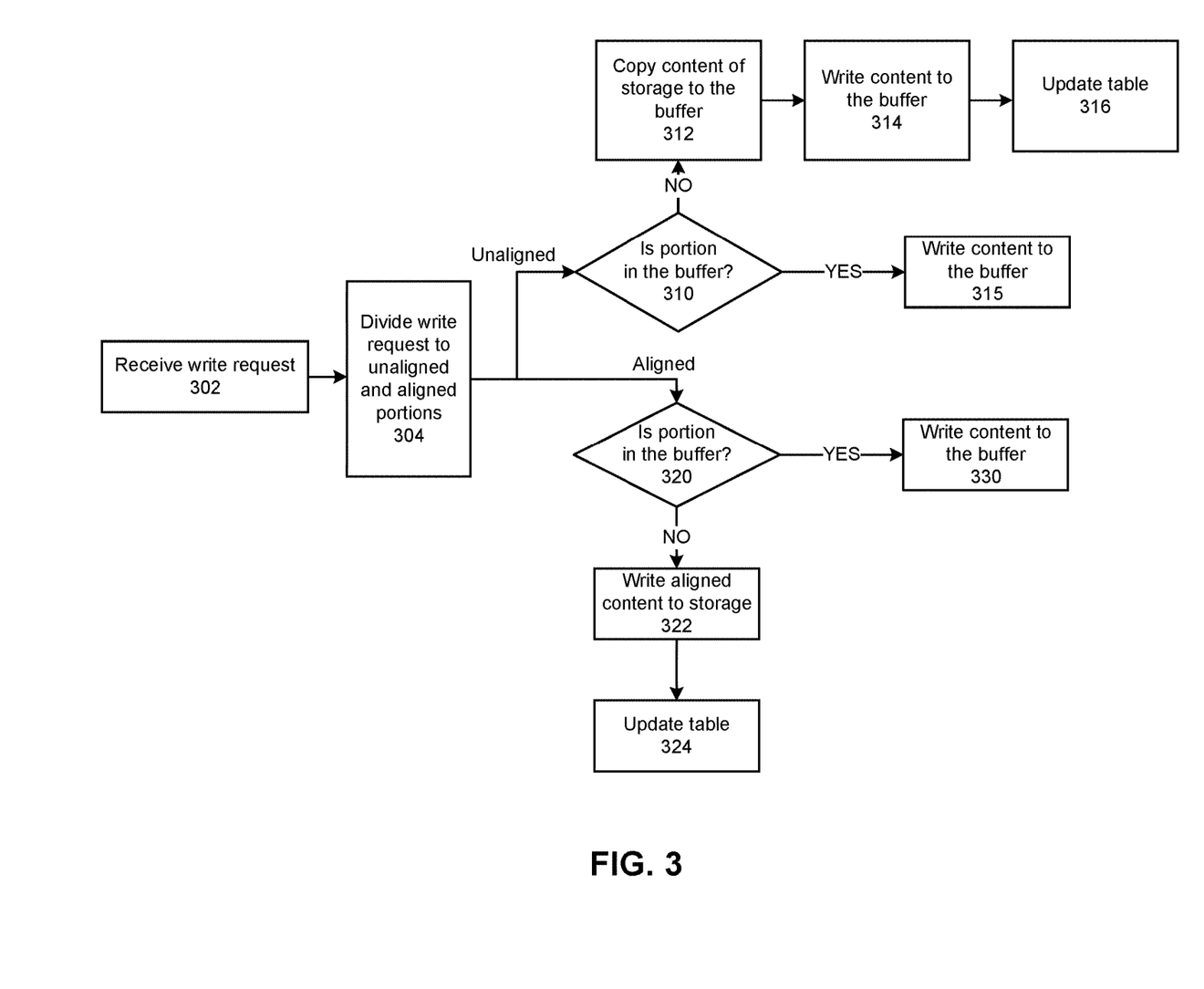
FIG. 3 depicts a process to handle aligned and misaligned portions of content to be written to storage.

FIG. 3 depicts an example process to manage storage of content to attempt to reduce write amplification. The process can be performed by a storage controller or other device or software. At 302, a write request is received. The write request can be provided by a host that is locally attached or remotely connected to a storage device. The write request can be received by a storage controller.

At 304, content to be written that is associated with the write request is divided into an unaligned portion and aligned portion. A portion can be considered "aligned" if an entirety of the portion overwrites a single retrieval segment stored in the storage. A retrieval segment can be an IU range from starting to ending boundary of an IU range in storage of memory. For example, a retrieval segment can be one or more IU segments that are stored at logical block address intervals of 8 bytes, 16 bytes, or other integer multiples of 8 bytes or other numbers of bytes or bits.

If the write request has any aligned portion, then the process continues to 320. If the write request has any unaligned portion, the process continues to 310. Note that sequences beginning with 310 and 320 can execute in parallel.

At 310, a determination is made if a retrieval segment corresponding to the unaligned portion is stored in the buffer. For example, a table (e.g., L2P table) can be inspected to determine if a retrieval segment associated with a logical block address provided with the write request is present in the buffer. If the retrieval segment is not stored in the buffer, the process continues to 312. If the retrieval segment is stored in the buffer, the process continues to 315.

At 312, one or more retrieval segments associated with the write request that are stored in the storage are copied to the buffer. For example, retrieval segments of one or more IUs can be read from storage and copied to the buffer. The process continues to 314, where content associated with the write request is written to the buffer. For retrieval segment(s) copied from the storage to the buffer in 312, part or an entirety of the retrieval segment(s) is overwritten by unaligned portion(s) associated with the write request. Subsequently, retrieval segments stored in the buffer can be copied to storage for consistency, persistence, or back-up. The process continues to 316, where the table is updated to indicate that retrieval segment(s) from the storage has/have been written to the buffer and the buffer stores one or more retrieval segments. For example, logical or physical addresses associated with content from the storage copied to the buffer are identified in the table as present in the buffer. The table can identify logical block addresses and physical block addresses of content in the buffer. A token in the first byte of a table entry can be used to identify retrieval segment(s) are present in the buffer.

At 315, content associated with the write request is written in the buffer. For retrieval segment(s) in the buffer, part or an entirety of the retrieval segment(s) is overwritten by unaligned portion(s) associated with the write request. Subsequently, retrieval segments stored in the buffer can be copied to storage for consistency, persistence, or back-up.

For example, if a write request corresponds to an LBA8 and a retrieval segment including the LBA8 is LBA8 to LBA15, the write request is unaligned. A retrieval segment of LBA8 to LBA15 is retrieved from storage and stored in the buffer, and the content associated with the write request and corresponding to LBA8 overwrites the content in the buffer.

For an aligned portion associated with the write request, at 320, a determination is made if a retrieval segment corresponding to the aligned portion is stored in the buffer. For example, a table (e.g., L2P table) can be inspected to determine if a retrieval segment associated with a logical block address provided with the write request is present in the table. If the retrieval segment is not stored in the buffer, the process continues to 322. If the retrieval segment is stored in the buffer, the process continues to 330.

At 322, the aligned portion is written to storage. For example, a controller can issue a write operation to copy the aligned portion to an IU range in storage but not store the aligned portion in the buffer.

At 324, the table identifying content of the buffer and the storage can be updated to identify content written to the storage. For example, an entry in the table can identify a range of logical block addresses or retrieval segments have corresponding content stored in the storage and not in the buffer. A code in an entry can indicate that the retrieval segments are not stored in the buffer but in the storage (or memory). However, in some examples, the controller can also write the aligned portion to the buffer and also update the table that identifies starting addresses (e.g., logical or physical) of content that are stored in the buffer.

At 330, the aligned portion is written to the buffer. For example, if the aligned portion corresponds to a retrieval segment that is already stored in the buffer, the controller can copy the data to the buffer directly. The aligned portion may not also be written to the storage at this juncture but can be written to the storage later as part of a back-up (e.g., power loss back-up operation). The table may not be updated as the retrieval segment is already stored in the buffer and identified as being stored in the buffed by the table due to a previous writing of content of that retrieval segment into the buffer.

Figure 4:
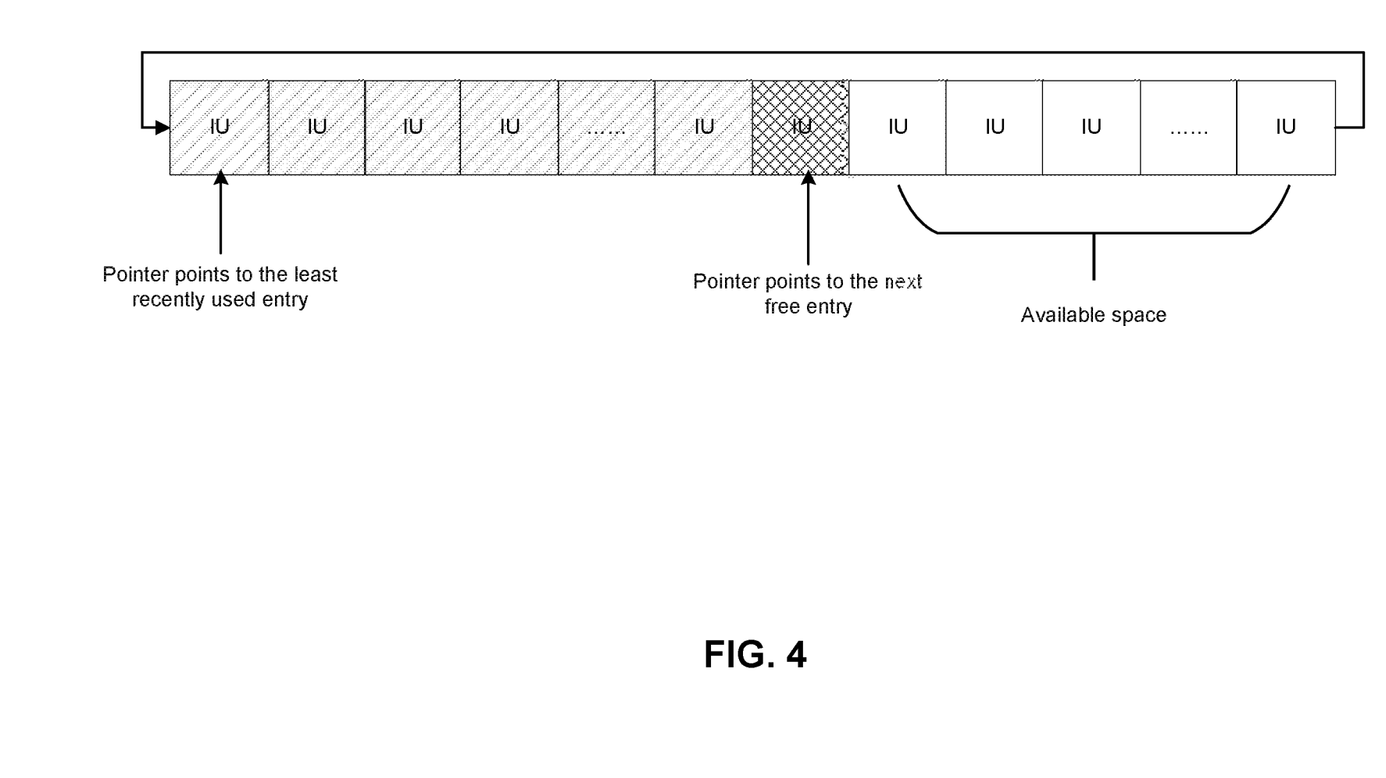
FIG. 4 depicts a format of pointers used to identify slots in a buffer.

FIG. 4 shows an example configuration of references to portions of a buffer. In this example, a buffer is configured as a circular buffer with pointers at IU granularity, but pointers could refer to multiple-IUs or sub-IU starting points. In this example, IUs are referenced in a linked list and there are three pointers. A first pointer can refer to a least recently used entry and a second pointer can refer to a next free entry in the buffer. If a new write request is received, an available IU entry among the available space is selected as the next free entry using the second pointer.

Figure 5:
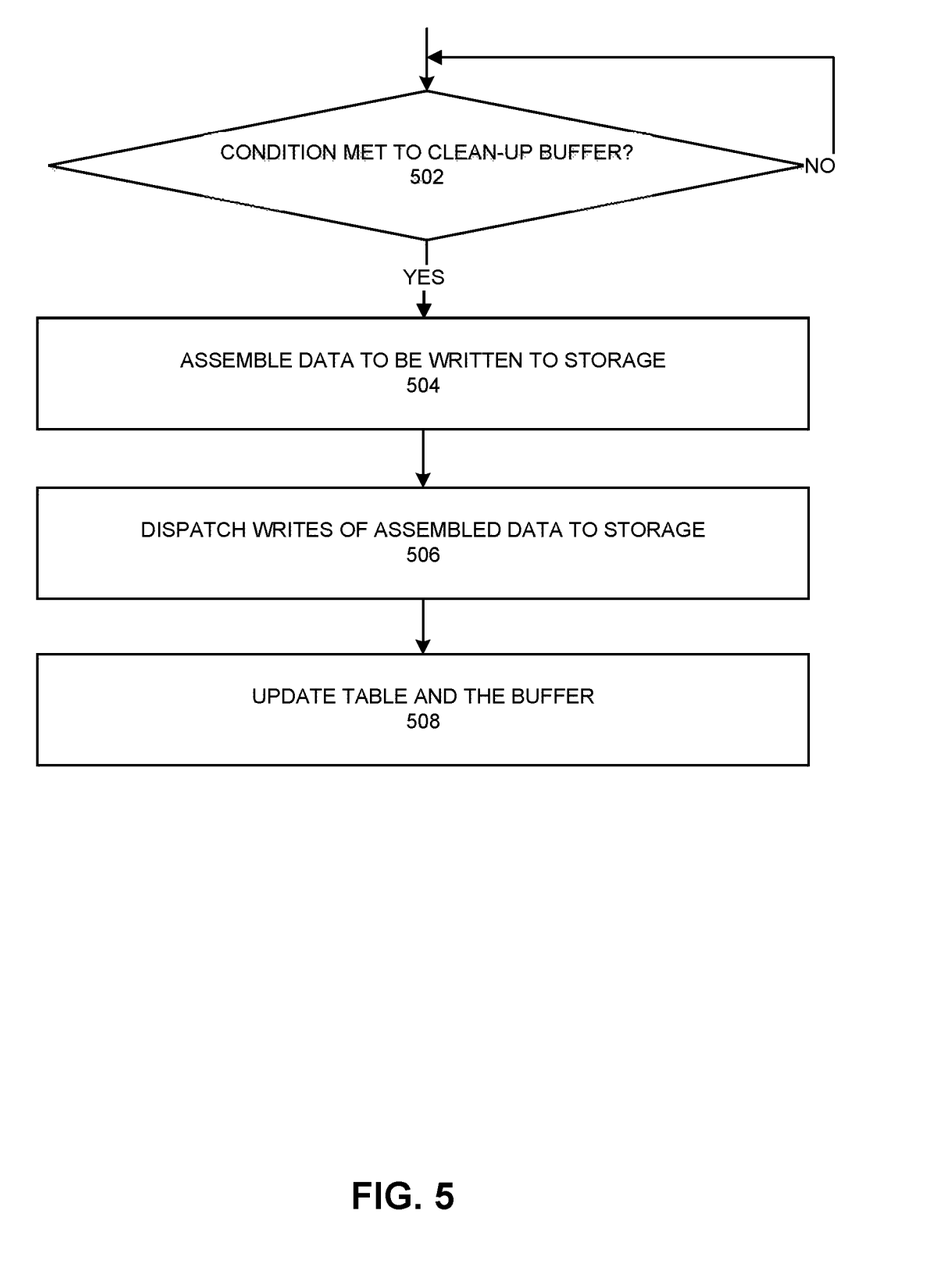
FIG. 5 depicts a process to manage buffer clean-up.

FIG. 5 depicts an example process that can be used to manage memory allocated to a buffer. For example, the buffer can be used to store one or more retrieval segments from a storage. A retrieval segment can be one or more IUs in size, where an IU is 4096 bytes, or other sizes.

At 502, a determination is made if a condition is met to clean-up a buffer. For example, a condition could be if there is insufficient free space in a buffer associated with the storage. For example, a threshold of 128 KiB can be considered a threshold level and if the free space is less than the threshold, the buffer can be considered to have insufficient free space. If there is insufficient free space, the process continues to 504. If there is not insufficient free space, the 502 can repeat. Another condition could be a timer expiring whereby garbage collection is performed to clean-up the buffer and free space. If the timer expires, then the process continues to 504 and the timer is reset. If the timer has not expired, 502 can repeat. Yet another condition could be power loss being detected. If power loss is detected, the process continues to 504.

For example, 502 can be performed after receipt of a write request or completion of a write request. A storage controller can check the available buffer space after a host write completes and if the buffer does not have enough free space, the controller can set a real-time operating system RTOS event (e.g., EVENT_NVM_BUFFER_FLUSH) to wake-up a task (e.g., Flush_NVM_BUFFER_Task) to flush selected content from the buffer to local or remote storage media to free more space available for use in the buffer.

At 504, data can be assembled to be written to storage. For example, one or more least recently used (LRU) IUs can be selected for flushing to the storage device. An LRU IU can be an IU that has been accessed a least amount of times over a time interval. In other words, an LRU IU can be data that has been partially overwritten or overwritten in-whole the least amount of times over a time interval. The IU(s) that have been partially overwritten or overwritten in-whole the least amount of times over a time interval can be selected for flushing. For example, in some examples, enough IUs are selected in order to increase free space in the buffer above the threshold level. However, a second threshold can be used to de-select or exclude certain IU from selection for flushing where the second threshold is higher than the threshold and indicates most recently used IUs (e.g., partially or fully overwritten). Any IU that meets this criteria of the second threshold are not flushed. Flushing can include updating a table to indicate that IU associated with the flushed IUs are not stored in the buffer and allowing the memory locations in the buffer to be overwritten.

At 506, assembled data can be dispatched to storage. For example, the assembled data determined in 504 can be dispatched by a storage controller for writing to storage.

At 508, a table that indicates content stored in the buffer and the storage can be updated. The table can be updated so that the one or more entries that correspond to the flushed data are updated to identify that the flushed data is stored in the storage. A subsequent write request that would partially overwrite any but not all of the flushed data could cause the controller to copy the data from the storage into the buffer and a corresponding table update. A subsequent write request that would overwrite an entire flushed IU could cause its data to be written directly to the storage and the corresponding table updated to identify a new starting storage location of the IU.

After 508, a central processing unit (CPU) or other processor can be released to start another task than buffer flush or the same task.

In some examples, if the buffer is in a separate device or house from a solid state drive (SSD) and a disk-caching controller is handling the writes, the disk-caching controller may write-back cache the mis-aligned portions of the incoming writes and send aligned write-requests to the SSD. The controller may not cache other sections of the write (but can continue to do so too) but will write-back cache the mis-aligned sections.

Figure 6:
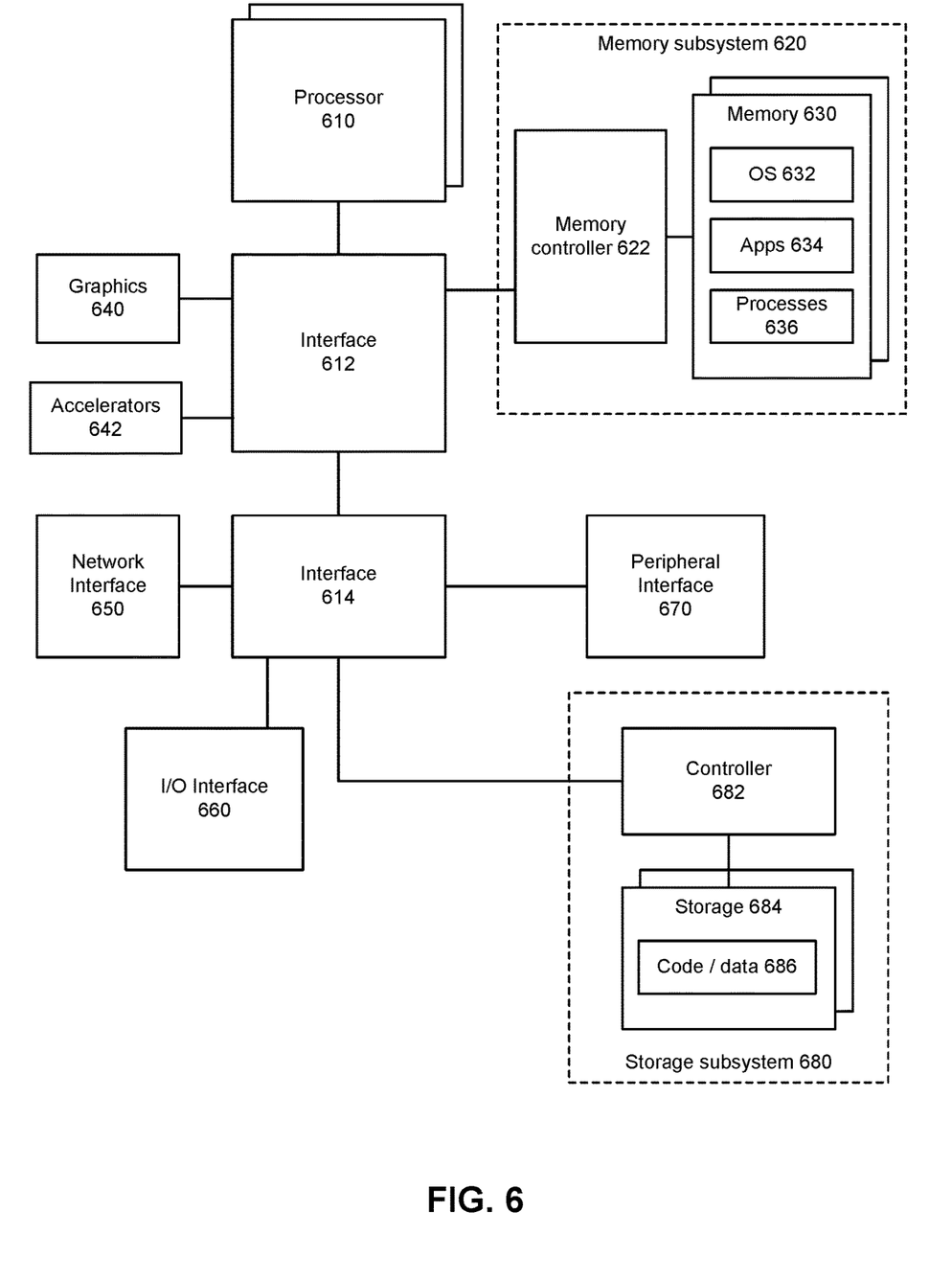
FIG. 6 depicts a system.

FIG. 6 depicts a system. The system can use embodiments described herein to attempt to reduce write amplification by using a buffer to store data misaligned from data write requests. System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640, or accelerators 642. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Accelerators 642 can be a fixed function offload engine that can be accessed or used by a processor 610. For example, an accelerator among accelerators 642 can provide compression (DC) capability, cryptography services such as public key encryption (PKE), cipher, hash/authentication capabilities, decryption, or other capabilities or services. In some embodiments, in addition or alternatively, an accelerator among accelerators 642 provides field select controller capabilities as described herein. In some cases, accelerators 642 can be integrated into a CPU socket (e.g., a connector to a motherboard or circuit board that includes a CPU and provides an electrical interface with the CPU). For example, accelerators 642 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs).

Accelerators 642 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a device that is in the same data center or rack or a remote device, which can include sending data stored in memory. Network interface 650 can receive data from a remote device, which can include storing received data into memory. Various embodiments can be used in connection with network interface 650, processor 610, and memory subsystem 620.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (e.g., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (e.g., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014, HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 600 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Figure 7:
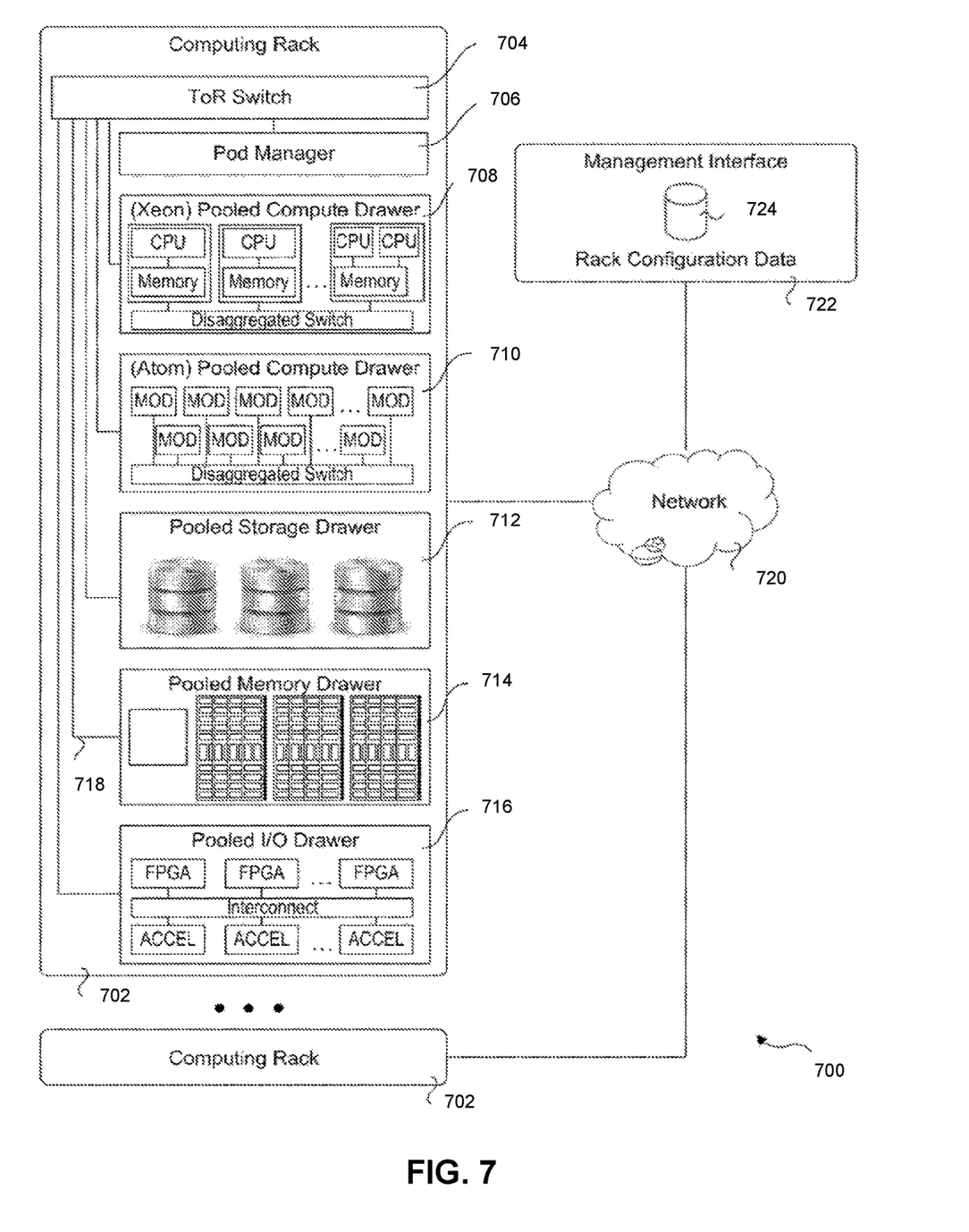
FIG. 7 depicts a data center environment.

FIG. 7 depicts an environment 700 includes multiple computing racks 702, each including a Top of Rack (ToR) switch 704, a pod manager 706, and a plurality of pooled system drawers. Various embodiments can be used in a switch. Generally, the pooled system drawers may include pooled compute drawers and pooled storage drawers. Optionally, the pooled system drawers may also include pooled memory drawers and pooled Input/Output (I/O) drawers. In the illustrated embodiment the pooled system drawers include an Intel® XEON® pooled computer drawer 708, and Intel® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or a 100+Gb/s Silicon Photonics (SiPh) optical link. In one embodiment high-speed link 718 comprises an 800 Gb/s SiPh optical link.

Multiple of the computing racks 700 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage all of the racks in the pod. Alternatively, distributed pod managers may be used for pod management operations.

Environment 700 further includes a management interface 722 that is used to manage various aspects of the environment. This includes managing rack configuration, with corresponding parameters stored as rack configuration data 724. Environment 700 can be used for computing racks.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module," "logic," "circuit," or "circuitry." A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes an apparatus that includes: a memory and a controller to receive a write request, wherein: based on the write request having associated content that does not encompass an entire retrievable region, configure a buffer in the memory to store a retrievable region and the associated content and based on the write request having associated content that encompasses an entire retrievable region and the retrievable region is not stored in the buffer, provide content associated with the write request to a storage media and not to the buffer.

Example 2 includes any example, wherein the controller is to: based on the write request having associated content that encompasses an entire retrievable region and the retrievable region is stored in the buffer, store the associated content in the buffer.

Example 3 includes any example, wherein the controller is to: based on the write request having associated content that encompasses an entire retrievable region and also includes but does not encompass a second entire retrievable region: based on the associated content that encompasses an entire retrievable region not being stored in the buffer, store a part of the associated content that encompasses an entire retrievable region in the storage media and store a part of the associated content that does not encompass the second entire retrievable region into the buffer.

Example 4 includes any example, wherein the controller is to: update a table to identify an address in the storage media associated with content written to the storage media.

Example 5 includes any example, wherein the controller is to: access a table to determine if a retrievable region is stored in the buffer.

Example 6 includes any example, wherein the table comprises at least one entry and when an entry is to indicate that a retrievable region is stored in the buffer, the entry includes a token of a particular value.

Example 7 includes any example, wherein when an entry refers to a retrievable region that is stored in the buffer, the entry includes an offset into a memory that stores the buffer to indicate a starting storage location of the retrievable region.

Example 8 includes any example, wherein when an entry is to indicate that a retrievable region is not stored in the buffer but stored in the storage media, the entry does not include a token of a particular value and includes a starting storage location of content in the storage media.

Example 9 includes any example, wherein the retrievable region comprises at least one Indirection Unit (IU).

Example 10 includes any example, wherein use of the buffer is to reduce write amplification, wherein write amplification comprises an amount of content written to storage media divided by an amount of content associated with the write request.

Example 11 includes any example, wherein the controller is to: based on a condition, flush content from the buffer to the storage media and update a table to indicate content is stored in the storage media.

Example 12 includes any example, wherein the condition comprises one or more of: expiration of a timer or fullness of the buffer meeting or exceeding a threshold.

Example 13 includes any example, and further includes: the storage media coupled to the controller and one or more of: a network interface, a fabric interface, a power supply, or a display.

Example 14 includes a computer-readable medium comprising instructions stored thereon, that if executed by one or more processors, cause the one or more processors to: receive a write request, wherein the write request comprises content and a starting address to store the content; determine if the content encompasses an entirety of a retrievable region associated with the starting address; based on the content not encompassing an entire retrievable region, configure a buffer to store the entire retrievable region; and based on the content encompassing an entire retrievable region and the retrievable region not stored in the buffer, provide content associated with the write request to a storage media and not to the buffer.

Example 15 includes any example and including instructions stored thereon, that if executed by one or more processors, cause the one or more processors to: based on the content encompassing an entire retrievable region stored in the buffer, store the content in the buffer.

Example 16 includes any example and including instructions stored thereon, that if executed by one or more processors, cause the one or more processors to: based on the content encompassing an entire retrievable region and also includes but does not encompass a second entire retrievable region: store a part of the content that encompasses an entire retrievable region in the storage media based on an entry indicating that the content, that encompasses an entire retrievable region, is not stored in the buffer and store a part of the content that does not encompass a second entire retrievable region into the buffer.

Example 17 includes any example and including instructions stored thereon, that if executed by one or more processors, cause the one or more processors to: update an entry to identify an address in the storage media associated with the content written to the storage media.

Example 18 includes any example and including instructions stored thereon, that if executed by one or more processors, cause the one or more processors to: access an entry to determine if a retrievable region is stored in the buffer.

Example 19 includes any example and including instructions stored thereon, that if executed by one or more processors, cause the one or more processors to: modify an entry to (1) indicate that a retrievable region is stored in the buffer by inclusion of a token of a particular value and (2) include an offset into a memory that stores the buffer to indicate a starting storage location of content.

Example 20 includes any example, wherein when an entry is to indicate that a retrievable region is not stored in the buffer and stored in the storage media, the entry does not include a token of a particular value and includes a starting storage location of content in the storage media.

What is claimed is:
1. An apparatus comprising:
a memory and
a controller to receive a write request, wherein:
based on the write request being associated with content that does not encompass an entire retrievable region:
retrieve content of the entire retrievable region from storage,
store the retrieved content of the entire retrievable region to a buffer in the memory, in the buffer, overwrite the content of the entire retrievable region with the associated content,
update a table to identify that the entire retrievable region is stored in the buffer;
based on the write request being associated with content that encompasses the entire retrievable region and the retrievable region is not stored in the buffer, provide content associated with the write request to a storage media for storage and not to the buffer; and
based on the write request being associated with second content that encompasses a second entire retrievable region and less than a third entire retrievable region:
provide a portion of the second content that encompasses the second entire retrievable region to the storage media for storage and not to the buffer,
retrieve content of the third entire retrievable region from the storage,
store the retrieved content of the third entire retrievable region to the buffer in the memory, and
in the buffer, overwrite the content of the third entire retrievable region with the portion of the associated second content that encompasses less than a third entire retrievable region.

2. The apparatus of claim 1, wherein the controller is to:
based on the write request having associated content that encompasses an entire retrievable region and the retrievable region is stored in the buffer, store the associated content in the buffer.

3. The apparatus of claim 1, wherein the controller is to:
access a table to determine if a retrievable region is stored in the buffer.

4. The apparatus of claim 3, wherein the table comprises at least one entry and when an entry is to indicate that a retrievable region is stored in the buffer, the entry includes a token of a particular value.

5. The apparatus of claim 4, wherein when an entry refers to a retrievable region that is stored in the buffer and the entry includes an offset into a memory that stores the buffer to indicate a starting storage location of the retrievable region.

6. The apparatus of claim 3, wherein when an entry is to indicate that a retrievable region is not stored in the buffer but stored in the storage media, the entry does not include a token of a particular value and includes a starting storage location of content in the storage media.

7. The apparatus of claim 1, wherein the retrievable region comprises at least one Indirection Unit (IU).

8. The apparatus of claim 1, wherein use of the buffer is to reduce write amplification, wherein write amplification comprises an amount of content written to storage media divided by an amount of content associated with the write request.

9. The apparatus of claim 1, wherein the controller is to:
based on a condition, flush content from the buffer to the storage media and update a table to indicate content is stored in the storage media.

10. The apparatus of claim 9, wherein the condition comprises one or more of: expiration of a timer or fullness of the buffer meeting or exceeding a threshold.

11. The apparatus of claim 1, further comprising:
the storage media coupled to the controller and one or more of: a network interface, a fabric interface, a power supply, or a display.

12. A non-transitory computer-readable medium comprising instructions stored thereon, that if executed by one or more processors, cause the one or more processors to:
receive a write request, wherein the write request comprises content and a starting address to store the content;
determine if the content encompasses an entirety of a retrievable region associated with the starting address;
based on the content not encompassing an entire retrievable region, configure a buffer to store the entire retrievable region;
based on the content encompassing an entire retrievable region and the retrievable region not stored in the buffer, provide content associated with the write request to a storage media and not to the buffer; and
based on the content encompassing both an entire retrievable region and a portion of a second entire retrievable region:
store the content that is associated with the entire retrievable region to the storage media,
retrieve, from the storage media, content that is associated with the second entire retrievable region,
store the retrieved content that is associated with the second entire retrievable region to the buffer, and
in the buffer, overwrite the content of the second entire retrievable region with the content encompassing the portion of the second entire retrievable region.

13. The computer-readable medium of claim 12, comprising instructions stored thereon, that if executed by one or more processors, cause the one or more processors to:
update an entry to identify an address in the storage media associated with the content written to the storage media.

14. The computer-readable medium of claim 12, comprising instructions stored thereon, that if executed by one or more processors, cause the one or more processors to:
access an entry to determine if a retrievable region is stored in the buffer.

15. The computer-readable medium of claim 12, comprising instructions stored thereon, that if executed by one or more processors, cause the one or more processors to:
modify an entry to (1) indicate that a retrievable region is stored in the buffer by inclusion of a token of a particular value and (2) include an offset into a memory that stores the buffer to indicate a starting storage location of content.

16. The computer-readable medium of claim 12, wherein when an entry is to indicate that a retrievable region is not stored in the buffer and stored in the storage media, the entry does not include a token of a particular value and includes a starting storage location of content in the storage media.

17. The apparatus of claim 9, wherein the condition comprises loss of power to the buffer.

18. The computer-readable medium of claim 12, comprising instructions stored thereon, that if executed by one or more processors, cause the one or more processors to:
based on a condition, flush content from the buffer to the storage media and update a table to indicate content is stored in the storage media, wherein the condition comprises one or more of: expiration of a timer, fullness of the buffer meeting or exceeding a threshold, or loss of power to the buffer.

* * * * *